Oct. 8, 1929. 1,730,962
S. E. ALLEY ET AL
TIPPING VEHICLE
Original Filed July 3, 1923   2 Sheets-Sheet 2
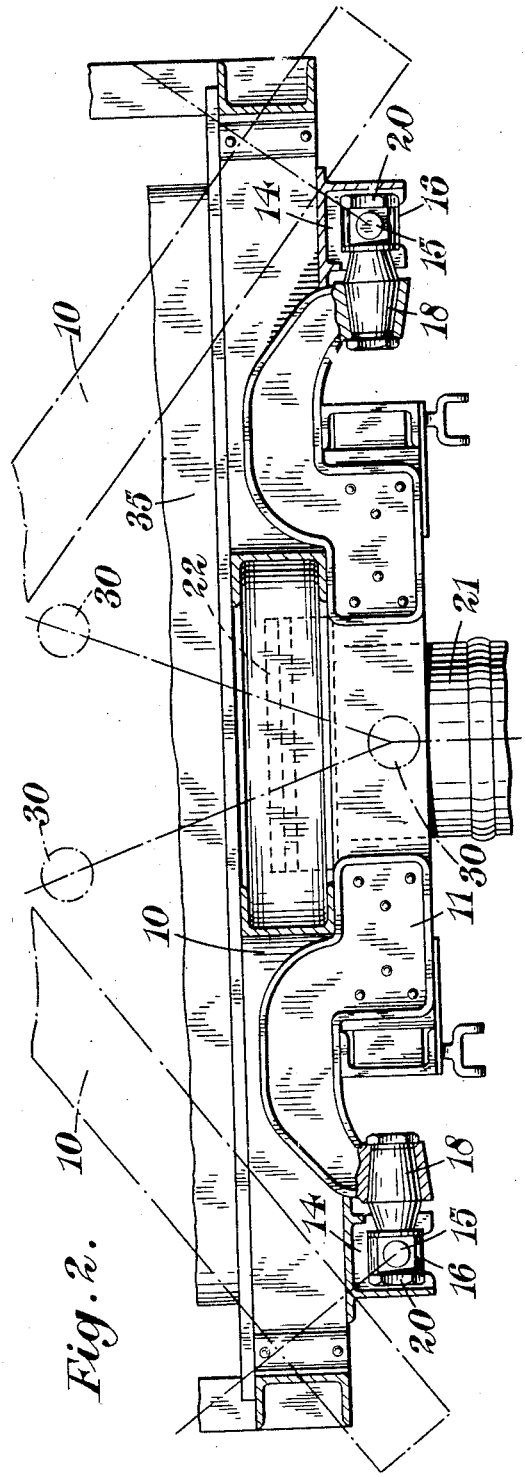
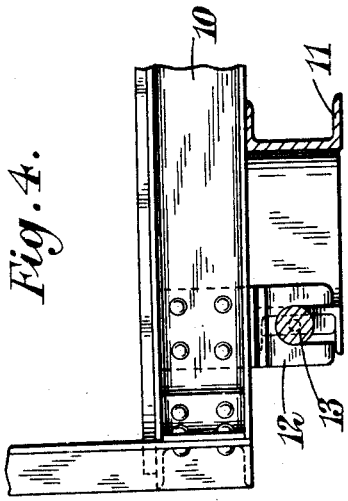

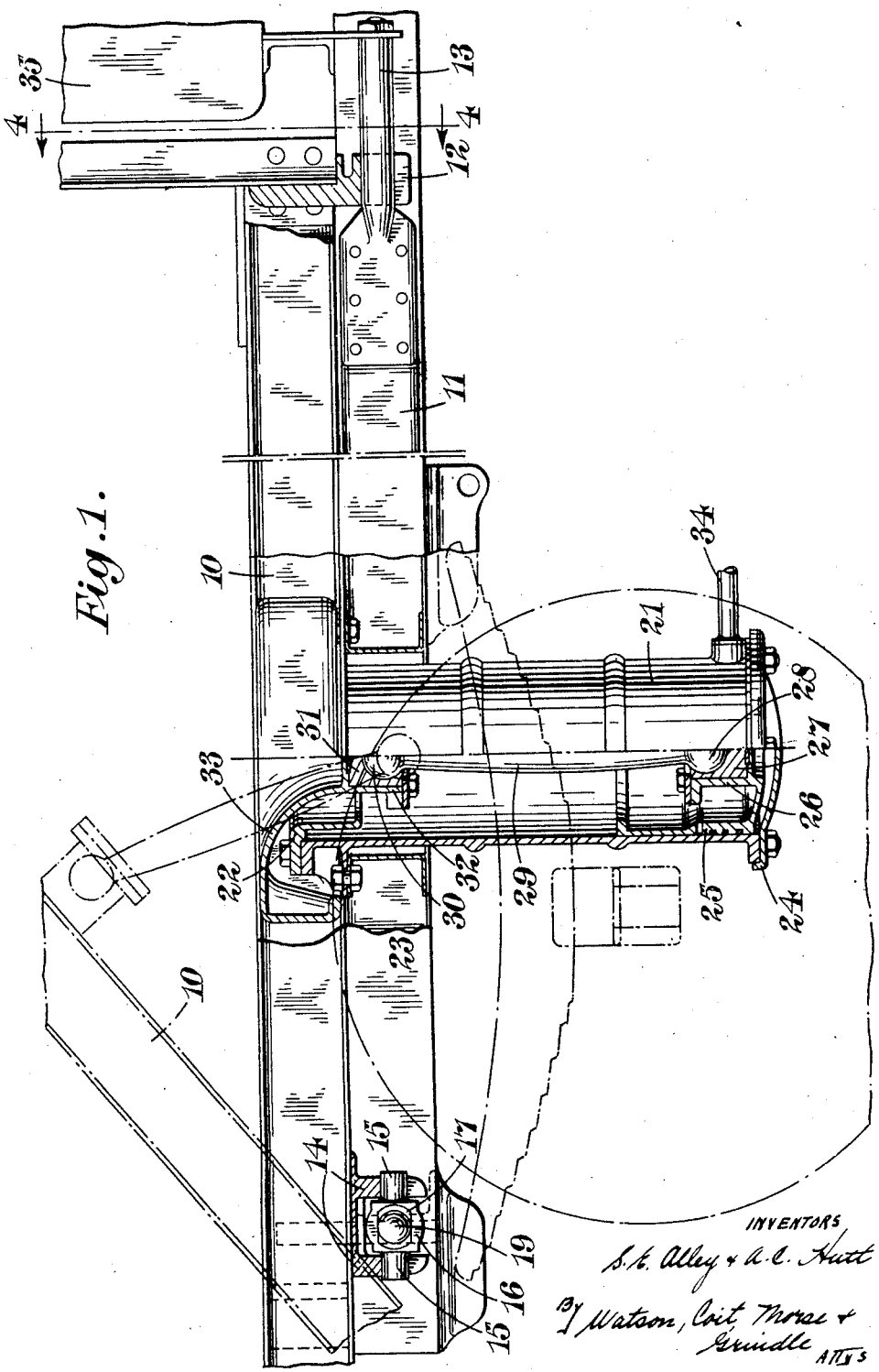

Patented Oct. 8, 1929

1,730,962

UNITED STATES PATENT OFFICE

STEPHEN EVANS ALLEY, OF LONDON, AND ARTHUR CYRIL HUTT, OF SHREWSBURY, ENGLAND, ASSIGNORS TO THE "SENTINEL" WAGGON WORKS LIMITED, OF LONDON, ENGLAND, A BRITISH COMPANY

TIPPING VEHICLE

Original application filed July 3, 1923, Serial No. 649,386, and in Great Britain July 28, 1922. Divided and this application filed April 7, 1928. Serial No. 268,269.

This invention relates to tipping-vehicles, and has for one of its objects to provide a more efficient form of tipping mechanism in conjunction with an improved mounting of the vehicle body on the chassis frame. The present application is a division of application Serial No. 649,386, resulting in Patent No. 1,674,495.

The invention is concerned with that type of tipping-vehicle in which the portion thereof to be tipped can be tipped in more than one direction and is operated for tipping by a piston working in a cylinder. In this type of vehicle adapted for tipping in more than one direction, it has been previously proposed so to mount the cylinder that it shall tilt as the tipping progresses. For a number of reasons it is undersirable to have the cylinder movable in this manner. A one-way tipping-vehicle has also been proposed in which the cylinder is mounted on one vehicle part rigidly to preclude tilting of the cylinder relatively to the part on which it is mounted while the cylinder plunger had a connecting rod with a single pin hinging joint at each end. Thus, the cylinder is left relatively stationary while the necessary tilting is taken up by the piston-rod or the like.

According to a primary feature of the present invention, there is provided a tipping-vehicle comprising the combination with a supporting frame, of a body pivotally supported thereby so as to tilt to either side or rear end about either of two lateral longitudinal axes or about a transverse axis that intersects the latter, a single vertical cylinder rigidly mounted on the frame underneath the body, a piston working in said cylinder, and a single-connecting rod having one end universally jointed to said piston and its other end universally jointed directly to said body at a point situated in the central longitudinal line of the body. Thus the body of the vehicle can be tipped about any one of a number of axes without causing the cylinder to tilt relatively to the vehicle-part on which it is mounted.

For a more complete understanding of the invention there will now be described, by way of example only and with reference to the accompanying drawings, a prefered form of tipping-vehicle embodying the invention. It is to be understood, however, that the invention is not limited to the precise constructional details set forth.

In these drawings—

Figure 1 is a side elevation, partly in section, of certain of the parts of a vehicle embodying the present invention, which vehicle is adapted for tipping about three axes. In this figure, many of the vehicle-parts are removed and there is shown in dot-and-dash lines one of the positions occupied during tipping;

Figure 2 is a rear elevation of certain of the parts shown in Figure 1, and in this figure there are shown in dot-and-dash lines, two other positions occupied during tipping;

Figure 3 is a plan of the vehicle on a scale smaller than that of the preceding figures; and Figure 4 is a section taken on the line 4—4 in Figure 1.

Like reference numerals indicate like parts throughout the drawings.

Referring firstly to Figures 1 and 2, the tipping-part or body of the vehicle is indicated at 10 and the relatively stationary part or chassis-frame at 11. Towards its forward end the tipping-part 10 carries at each side of the vehicle a fork 12 which bears upon a cylindrical support 13 rigidly secured to the vehicle-part 11. Towards its rear end the tipping-part 10 also carries, at each side, a double fork 14. These double forks are each received upon the cylindrical ends 15 of cruciform supporting members which are constructed as follows:—

The cylindrical portions 15 are connected together by an intermediate portion 16 having a flat-sided perforation through it, and this perforation is slipped over a correspondingly shaped projection 17 from a conical support 18. These conical supports lie transversely of the vehicle and are in axial alignment with each other, their axis being the axis about which the tipping-part 10 is tilted for rearward tipping, namely as shown in chain lines in Figure 1. Beyond each flatted portion 17 is a screwed cylindrical portion 19 on which is received a nut 20 whereby the member 15, 16 is secured in place on the said flatted portion. The axis of the cylindrical members 15 at each side of the vehicle is in alignment with the axis of the corresponding cylindrical member 13 and the two axes thus formed along the sides of the vehicle are the axes about which the transverse tipping takes place; see the chain lines in Figure 2. Further, these two axes of transverse tipping are intersected by the axis aforesaid of the conical supports 18 about which rearward tipping takes place. Suitable clamps or tie-members (not shown) are provided for securing the body 10 to the chassis-frame 11 and when tipping is required the clamps will be released according to the direction in which the tipping is to occur.

Rigidly mounted upon the vehicle-part 11 is a cylinder 21. This cylinder has its upper end partially closed by an inturned flanged plate 22, and the cylinder has an external flange 23 whereby it is secured in place. The lower end of the cylinder is closed by a cover 24 and a piston 25 reciprocates inside the cylinder. This piston is formed with a central housing 26 for blocks 27 which receive the ball-shaped end 28 of a rod 29. The other end of this rod is similarly shaped at 30 and is received in blocks 31 housed in a casing 32 which depends from a support 33 carried upon the tipping-part 10. Fluid under pressure is admitted to and exhausted from the cylinder 21, below the piston 25, through a suitable conduit such as 34. Conveniently, this fluid may be water from a reservoir 35 maintained under steam pressure.

It is preferred to employ only a single cylinder and piston as just described and to arrange the same at a suitable central position in the vehicle so that the power will be available for tipping in all three directions, but it will be appreciated that more than one cylinder and piston arranged on the central longitudinal line of the vehicle may be employed for this purpose if desired.

The general scheme of operating the vehicle may be similar to that already adopted in connection with the well-known vehicles in which the cylinder is pivoted to tilt during tipping, but it will be appreciated that it is advantageous to employ the arrangement according to the present invention since by always maintaining the cylinder stationary in regard to the vehicle-part on which it is carried, the connections for the supply of fluid-pressure can be more satisfactorily maintained. The arrangement according to the present invention also presents advantages which need not be herein detailed.

It is to be understood that the invention is not limited to the precise constructional details hereinbefore set forth. For example, for some constructions it is unnecessary to employ ball-joints at the ends of the rod 29 as some other form of universal joint may be satisfactory for some arrangements of tipping.

We claim:

1. A tipping-vehicle comprising the combination of a supporting frame, four lateral pivotal supports arranged thereon in pairs situated one pair towards each end of the frame, the supports of the pair at one end being cruciform and providing one transverse axis of pivoting and also two longitudinal axes of pivoting, which latter are co-axial each with the axis of pivoting of a pivotal support at the other end, a body supported by said pivotal supports so as to tilt to either side or rear end, a vertical cylinder rigidly mounted on the frame underneath the body, a piston working in said cylinder, and a single connecting rod having one end universally jointed to said piston and its other end universally jointed directly to said body at a point situated in the central longitudinal line of the body.

2. A tipping-vehicle comprising the combination of a supporting frame, four lateral pivotal supports arranged thereon in pairs situated one pair towards each end of the frame, the supports of the pair at one end being each cruciform and providing one transverse axis of pivoting and also two longitudinal axes of pivoting, which latter are co-axial each with the axis of pivoting of a pivotal support at the other end, a body having six forks supported each by one of said pivotal supports so as to tilt to either side or rear end, a vertical cylinder rigidly mounted on the frame underneath the body, a piston working in said cylinder, and a connecting-rod having one end universally jointed to said piston and its other end universally jointed directly to said body at a point situated in the central longitudinal line of the body.

In testimony whereof we have signed our names to this specification.

STEPHEN EVANS ALLEY.
ARTHUR CYRIL HUTT.